Figure 1:
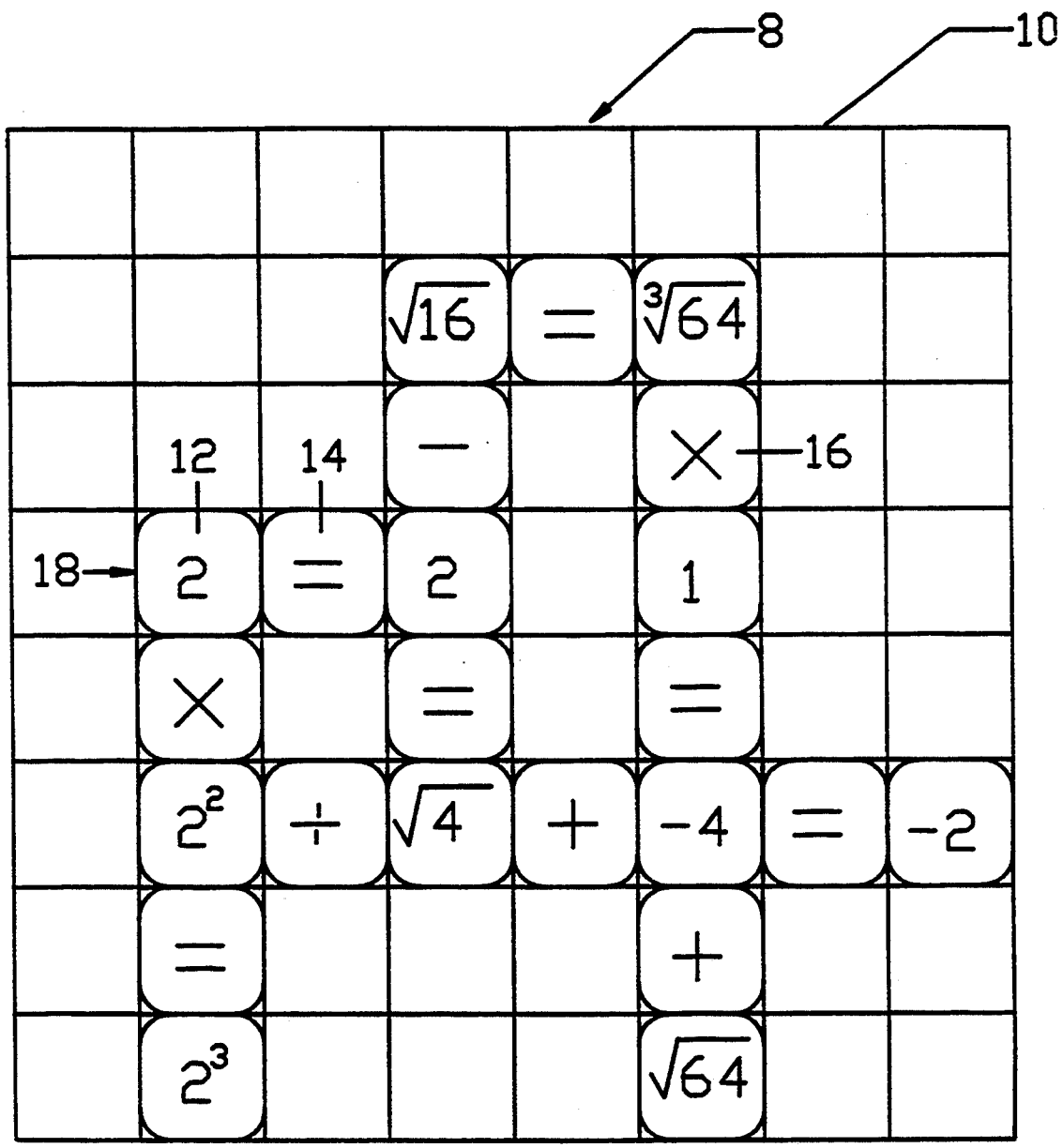

United States Patent [19]
Rheams

[11] Patent Number: 5,338,203
[45] Date of Patent: Aug. 16, 1994

[54] EDUCATIONAL AID FOR MATHEMATICS

[76] Inventor: William N. Rheams, 410 Hesper Ave., Metairie, La. 70005

[21] Appl. No.: 41,837

[22] Filed: Apr. 1, 1993

[51] Int. Cl.$^5$ .................. G09B 1/00; G09B 19/00; G09B 19/02
[52] U.S. Cl. .................. 434/208; 434/191; 273/272
[58] Field of Search .............. 273/272; 434/208, 191, 434/209, 188, 189

[56] References Cited

U.S. PATENT DOCUMENTS

| | | | |
|---|---|---|---|
| 3,267,590 | 8/1966 | Browning | 273/272 |
| 3,314,168 | 4/1967 | Heckman | 434/208 |
| 3,844,568 | 10/1974 | Armstrong | 434/208 X |
| 3,904,207 | 9/1975 | Gold | 273/272 |
| 4,316,612 | 2/1982 | Harder | 273/272 |
| 4,808,111 | 2/1989 | Pratt | 434/191 |
| 4,884,973 | 12/1989 | Pak | 434/191 |
| 5,040,987 | 8/1991 | Frazier | 434/188 |
| 5,176,381 | 1/1993 | Winters | 434/208 X |

FOREIGN PATENT DOCUMENTS

| | | | |
|---|---|---|---|
| 2658428 | 8/1991 | France | 273/272 |
| 2018606 | 10/1979 | United Kingdom | 273/272 |
| 2121692 | 1/1984 | United Kingdom | 434/191 |

*Primary Examiner*—Gene Mancene
*Assistant Examiner*—Cindy A. Cherichetti

[57] ABSTRACT

Mathematics teaching aid for recognition of numerical and functional equivalents and spatial relationships having tiles (12, 14, 16) marked with numerals (12), functions (14), and equals (16) and a baseboard (10) with intersecting rows of spaces where two to four students can form linear equations (18) by aligning the proper tiles on the baseboard (10) which intersect at right angles and share one tile.

1 Claim, 1 Drawing Sheet

EDUCATIONAL AID FOR MATHEMATICS

BACKGROUND—FIELD OF INVENTION

This invention relates to an educational aid for mathematics, specifically to an aid for recognition of numerical and functional equivalents and spatial relationships.

BACKGROUND—DESCRIPTION OF PRIOR ART

Boards upon which cards bearing numbers and functions could be arranged to show the problem and solution of a simple linear equation have been used as a teaching aid. Various designs of a frame to hold cards marked with whole numbers, functions and equals to perform a single mathematical step of the form $A+B=C$ have been patented. The focus of the art has been primary education.

The following designs are of this type, U.S. Pat. No. 4,808,111 to Pratt (1989) which discloses a base plate or board with inserts. The inserts and recesses including corresponding notches so that inserts can fit into the recesses.

U.S. Pat. No. 4,884,973 to Pak (1989) discloses cards with holes and a board with pegs upon which the cards can be alined. U.S. Pat. No. 5,040,987 to Frazier (1990) discloses notches to align the cards on the board for numbers and inserts that fit into recesses for the functions. All of the aids for mathematics heretofore known suffer from a number of disadvantages.

(a) They are linear, they operate in only one direction.
(b) They are limited in that they only provide space for one equation in the form $A+B=C$.
(c) They are solution oriented.
(d) There is only one correct answer.
(e) They use only whole numbers.
(f) They have a fixed structure.

None of the prior patents discussed above discloses a structure equivalent to this invention.

OBJECTS AND ADVANTAGES

Accordingly several objects and advantages of the present invention are:

(a) To provided a board upon which both horizontal and vertical placement is possible
(b) To provide space for longer linear equations.
(c) To allow the play of equivalents such as $A+B=-B+A$
(d) All true mathematical statements are correct
(e) To supply tiles marked with fractions, decimals, squares, cubes, square roots, cube roots, variables, negative numbers and whole numbers.
(f) To allow play in any available space.

Further objects and Advantages are:
(1) Learning the rules of mathematics
(2) Learning the language of mathematics
(3) Linking verbal and mathematical skills
(4) Providing a use for mathematical skills Still further objects and advantages will become apparent from a consideration of the ensuing description and drawings.

DRAWING FIGURES

FIG. 1 is a plan view of the educational aid of the present invention illustrating the tiles oriented on the base board forming linear equations at right angles with shared tiles.

REFERENCE NUMERALS IN DRAWING

8 Educational Aid
10 Baseboard with a plurality of intersecting rows of spaces
12 Tiles marked with numerals
14 Tiles marked with equals
16 Tiles marked with functions
18 A group showing linear equation

DESCRIPTION FIG. 1

A typical embodiment of the educational aid of the present invention is illustrated in FIG. 1 (plan view) generally designated by the reference numeral 8 and includes a base board 10 with a plurality of intersecting rows of spaces and tiles 12, 14, and 16 which are of identical construction as far as shape is concerned and are in form generally square or rectangular. They are of a thickness to allow easy handling. Numerical tiles 12 are marked on one side with whole numbers, negative numbers, fractions, decimals, squares of numbers, cubes of numbers, higher powers of certain numbers, square roots of numbers, cube roots of numbers, the variables x, y, and z, the notation for square and cube and the imaginary number i. Equals tiles 14 are marked on one side with the equal sign =. Function tiles 16 are marked on one side with the function signs for plus (+), minus (−), times (×), divide (+) and the fraction bar (/).

OPERATIONS OF INVENTION

The present invention operates at many levels according to the mathematical skill of the students. Beginners use whole numbers and plus and minus as they develop skill, times and divide are added then the other forms of numerical notation as needed. The basic operation remains the same. The tiles are placed face down. Two to four students each draw a numeral tile 12. The student with the highest absolute value goes first. The drawn numerical tiles 12 are placed back in the pile face down mixed up then each student draws six numerical tiles 12, one equals tile 14, and four function tiles 16. The first student then starts off by placing as many of their eleven tiles 12, 14, and 16 upon the baseboard 10 using at least one of the center spaces to form a linear equation. As long as the equation is a true mathematical statement it is correct. The student then reads the equation aloud and claims points one for each tile 12, 14, or 16 played. The student then draw tiles 12, 14, and 16 equal to the number and type played. The second player then plays at right angles to the first play using one of the tiles 12, 14, or 16 already played or adds to the first equation using as many tiles 12, 14, or 16 as possible. The second student then reads the equation aloud and claims points one for each tile played plus the tiles used from the first play. The second player then draws replacement tiles 12, 14, and 16 as used in play. This process continues until all tiles 12, 14, or 16 or available spaces have been used.

SUMMARY OF THE INVENTION

The educational aid of the present invention is designed to teach the relationship between the number systems. Also it is in the form of a board game for two to four players to promote learning through competition.

In the method of the present invention, the game is played on a baseboard with a plurality of intersecting rows of spaces each space being common to one vertical and one horizontal row, and a plurality of tiles being classified into three sets of different color. The tiles of one set bearing numerical designation including the following: whole numbers, negative numbers, fractions, decimals, squares of numbers, cubes of numbers, higher powers of certain numbers, square roots of numbers, cube roots of numbers, the variables x,y,z, the imaginary number i.

The tiles of the second set bearing function designation including the following: + plus, ' minus, × multiplication, ÷ division, and the fraction bar /.

The tiles of the third set bear the equals sign =.

The tiles are chosen for the desired level of play, placed face down and shuffled. Each player draws one numerical tile. The player who's tile has the highest apparent value goes first. The drawn tiles are returned to the pile and reshuffled. Each player draws six numerical tiles, four function tiles, and one equals tile. The first student then starts off by placing as many of their eleven tiles upon the board, using at least one of the center spaces, to form a linear equation. The student then reads the equation aloud and claims points, one for each tile played. The student then draws tiles equal to the number and type played. The second player then plays at right angles to the first play using one of the tiles played or adds to the first equation aloud and claims points, one for each tile played plus the tiles used from the first play. The second player then reads the equation aloud and claims points, one for each tile played plus the tiles used from the first play. The second player then draws replacement tiles as used in play. Thus process continues until all tiles or available spaces have been used.

What is claimed is:

1. A teaching aid for mathematics comprising:
   a. a baseboard with a plurality of intersecting rows of spaces each space being common to one vertical and one horizontal row,
   b. a plurality of tiles being the same size as the spaces on the baseboard,
   c. The tiles of one set bearing numerical designation including the following:
   whole numbers,
   negative numbers,
   fractions,
   decimals,
   squares of numbers,
   cubes of numbers,
   higher powers of certain numbers,
   square roots of numbers,
   cube roots of numbers,
   the variables x,y,z,
   the imaginary number i,
   d. the tiles of the second set bearing function designation including,
   + plus,
   − minus,
   × multiplication,
   ÷ division,
   / the fraction bar,
   e. the tiles of the third set bear the equals sign =,
   f. a wet of instructions for playing a game whereby, said tile are placed n said baseboard to form linear equations that intersect at right angles sharing one of said tiles in common.

* * * * *